(12) United States Patent
Shimada et al.

(10) Patent No.: US 6,331,499 B1
(45) Date of Patent: Dec. 18, 2001

(54) MICROWAVE DIELECTRIC CERAMIC COMPOSITION

(75) Inventors: Takeshi Shimada, Kyoto; Keisuke Kageyama, Toyonaka; Soyoko Ando, Ibaraki, all of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/701,310

(22) PCT Filed: Jun. 4, 1998

(86) PCT No.: PCT/JP98/02467

§ 371 Date: Feb. 9, 2001

§ 102(e) Date: Feb. 9, 2001

(87) PCT Pub. No.: WO99/62840

PCT Pub. Date: Dec. 9, 1999

(51) Int. Cl.[7] .................................................. C04B 35/46
(52) U.S. Cl. ................................................................ 501/139
(58) Field of Search ............................................... 501/139

(56) References Cited

FOREIGN PATENT DOCUMENTS

| 55131901 | 10/1980 | (JP) . | |
|---|---|---|---|
| 1128309 | 5/1989 | (JP) . | |
| 3192606 | 8/1991 | (JP) . | |
| 4265269 | 9/1992 | (JP) . | |
| 6-80467 | * 3/1994 | (JP) | ................ C04B/35/46 |
| 597508 | 4/1994 | (JP) . | |
| 817243 | 1/1996 | (JP) . | |
| 8335810 | 12/1996 | (JP) . | |

* cited by examiner

*Primary Examiner*—David Brunsman
(74) *Attorney, Agent, or Firm*—Dykema Gossett PLLC

(57) ABSTRACT

A microwave dielectric ceramic composition exhibiting excellent relative permitting ($\in$) and high Qf-value, enabling the temperature coefficient of resonance frequency to be easily adjusted, and being best suited for a filter having cavities made of, e.g., iron or copper exhibiting a large temperature coefficient of resonance frequency. The ceramic is of a $BaO$—$TiO_2$—$Nd_2O_3$—$Sm_2O_3$ ceramic, type wherein $Nd_2O_3$ is partly substituted by $Bi_2O_3$, $Nd_2O_3$ is Partly substituted by $Ln_2O_3$ (where Ln is La, Ce or Pr) and, the above substituted $Ln_2O_3$ is partly substituted by $EU_2O_3$ to improve the properties so that $\in$ is 82.5 to 92.5, Qf is 6000 to 7300 GHz and τf is 10–20 ppm/° C. This makes it possible to impart favorable electric characteristics to resonance cavities of various materials and sizes.

1 Claim, No Drawings

MICROWAVE DIELECTRIC CERAMIC COMPOSITION

This is a 371 of PCT/JP98/02467 filed Jun. 4, 1998.

DESCRIPTION

1. Technical Field

The present invention relates to a dielectric ceramic composition whose chief constituents are Ba, Ti, Sm. Nd, La, Ce, Pr, Bi and $O_2$, additionally containing $Eu_2O_3$ and having the properties $\in=82.5$ to 92.5, Qf=6000 to 7300 GHz, τf=10 to −20 ppm/° C. which is capable of being employed as a dielectric resonance material or frequency adjusting rod thereof.

2. Background Art

In recent years, with the development of new media in the field of electronic technology, there has been rapid progress in miniaturization and digitization. In particular, in the field of communications using microwaves such as satellite communication, car phones, and mobile telephones, advanced miniaturization of components and high levels of reliability are being demanded.

In conventional microwave circuits cavity resonators or waveguides are employed as filter or transmission circuits so this has presented an obstacle to such miniaturization and enhanced reliability. Specifically, in cavity resonators or waveguides, basically the stability of air or vacuum as a propagation medium for electromagnetic waves is made use of; in order to miniaturize a microwave circuit portion as aforesaid, a propagation medium may be employed which has a larger dielectric constant than the dielectric constant of air or vacuum and which has the same level of high stability in respect of temperature as air or vacuum. If this is done, the propagation wavelength of the microwaves in the medium is $1/\sqrt{\in r}$ (where $\in r$ is the relative permittivity), so the resonant wavelength is also $1/\sqrt{\in r}$ and miniaturization can be achieved.

Previous microwave dielectric ceramic compositions that have been proposed include $BaO-TiO_2-Nd_2O_3-Bi_2O_3$ based ceramics (Laid-open Japanese Patent Publication Sho. 56-102003) and $BaO-TiO_2-Sm_2O_3-CeO_2-Bi_2O_3$ based ceramics (Laid-open Japanese Patent Publication Sho. 62-187162). However, these materials suffered from the problems of their Qf value as a microwave communication dielectric being low at 4000 to 6500 and that adjustment of the temperature characteristic of frequency for various cavities was not easy.

Also, $BaO-TiO_2-Ln_2O_3$ based ceramics (where $Ln_2O_3$ represents addition of $Cr_2O_3$ to $Nd_2O_3$ or $Pr_6O_{11}$) (Japanese Laid-open Patent Publication H. 7-169326) have a relative permittivity value ($\in$) of 91 to 93, but they were subject to the problems that their Q value is low at 5700 to 6000, and their temperature coefficient τf of resonance frequency is 6 to 9 ppm/° C., so that they cannot be employed in filters where the cavity material has a large temperature coefficient of resonance frequency, such as iron or copper.

SUMMARY OF THE INVENTION

An object of the present invention is to provide a microwave dielectric ceramic composition whereby the problems of the prior art microwave dielectric ceramic composition are solved, which is of excellent relative permittivity ($\in$) characteristic, has a high Qf value, whereby adjustment of the temperature coefficient of the resonance frequency can easily be achieved, and which is ideal for filters where the cavity material has a large temperature coefficient of resonance frequency, such as iron or copper.

As a result of various studies of ceramic compositions with the object of providing a microwave dielectric ceramic composition of high Qf value and of improved temperature characteristic, the present inventors discovered that the properties: $\in=88.5$ to 92.5, Qf=6000 to 7300 GHz, τf=3 to −10 ppm/° C. could be obtained by, in a $BaO-TiO_2-Nd_2O_3-Sm_2O_3$ based ceramic, substituting some of the $Nd_2O_3$ by $Bi_2O_3$ and further substituting some of the $Nd_2O_3$ by $Ln_2O_3$ (where Ln=La, Ce, Pr).

Furthermore, they discovered that, by substituting some of the aforementioned substituted $Ln_2O_3$ with $Eu_2O_3$, a material could be provided with temperature coefficient τf of resonance frequency improved to 10 to −20 ppm/° C. and furthermore, the foregoing material may be sintered in the atmosphere; however, they discovered that, by sintering in an atmosphere containing at least 80% of oxygen, excellent properties in respect of the Qf value and/or τf value mentioned above are provided, and in addition the permittivity $\in$ of frequency is improved to 82.5 to 92.5, thereby perfecting the present invention.

BEST MODE FOR CARRYING OUT THE INVENTION

The present invention consists in a microwave dielectric ceramic composition whose compositional formula is represented by:

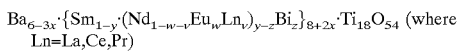

$Ba_{6-3x} \cdot \{Sm_{1-y} \cdot (Nd_{1-w-v}Eu_wLn_v)_{y-z}Bi_z\}_{8+2x} \cdot Ti_{18}O_{54}$ (where Ln=La,Ce,Pr)

where the values of x, y, z, y−z, w and v in the compositional formula satisfy the following values:

$0.5<x<0.8$, $0.3<y<0.5$, $0<z<0.4$, $y-z>0$, $0<w\leq 1, 0<v\leq 1$.

The reasons for the restrictions in the composition of the present invention will now be described. In a dielectric ceramic composition of compositional formula $Ba_{6-3x} \cdot \{Sm_{1-y} \cdot (Nd_{1-w-v}Eu_wLn_v)_{y-z}Bi_z\}_{8+2x} \cdot Ti_{18}O_{54}$, if x is less than 0.5, the Q value of the dielectric falls; if it is more than 0.8, the permittivity falls; these are therefore undesirable. Also, if y is less than 0.3, this tends to cause a drop in permittivity, while if it is more than 0.5, the Q value falls: these are therefore undesirable. Furthermore, if z exceeds 0.4, the Q value drops severely; this is therefore undesirable.

Also, in the above compositional formula, if w and v are both zero, the permittivity becomes low, and furthermore the temperature characteristic becomes negative and the temperature characteristic cannot be controlled even by addition of Eu, so it is desirable that w and v are not both zero: at least either one of w or v should preferably have a positive value.

The properties of the dielectric ceramic composition of the present invention can be continuously varied between $\in=82.5$ to 92.5, temperature characteristic of frequency 10 to −20 ppm/° C. Excellent electrical properties can thereby be conferred on resonance cavities of various materials and sizes.

EXAMPLES

Example 1

$BaCO_3$, $Sm_2O_3$, $Nd_2O_3$, $Eu_2O_3$, $La_2O_3$, $Bi_2O_3$, and $TiO_2$ powder of grain size of 1 μm or less, according to the compositional formula $Ba_{6-3x} \cdot \{Sm_{1-y} \cdot (Nd_{1-w-v}Eu_wLn_v)_{y-z}Bi_z\}_{8+2x} \cdot Ti_{18}O_{54}$ were blended and mixed with x=0.7, y=0.4, z=0.1, and v=(0.45, 0.4, 0.35, 0.3, 0.25, 0), w=(0.05, 0.1, 0.15, 0.2, 0.25, 0.5) before molding under pressure of 1.5 T/cm² followed by sintering for three hours at 1370° C. in air and in a 100% $O_2$ atmosphere to manufacture dielectric ceramics which were used to produce 4.7 GHz band resonators whose properties are shown in Table 1.

Example 2

$BaCO_3$, $Sm_2O_3$, $Nd_2O_3$, $Eu_2O_3$, $CeO_2$, $Bi_2O_3$, and $TiO_2$ powder of grain size of 1 μm or less, according to the same compositional formula as in Example 1 were blended and mixed with x=0.7, y=0.4, z=0.1, and v=(0.45, 0.4, 0.35, 0.3, 0), w=(0.05, 0.1, 0.15, 0.2, 0.5), before manufacturing dielectric ceramics under the same manufacturing conditions as in Example 1 which were used to produce 4.7 GHz band resonators whose properties are shown in Table 2.

Example 3

$BaCO_3$, $Sm_2O_3$, $Nd_2O_3$, $Eu_2O_3$, $Pr_6O_{11}$, $Bi_2O_3$, and $TiO_2$ powder of grain size of 1 μm or less, according to the same compositional formula as in Example 1 were blended and mixed with x=0.7, y=0.4, z=0.1, and v=(0.45, 0.4, 0.35, 0.3, 0), w=(0.05, 0.1, 0.15, 0.2, 0.5), before manufacturing dielectric ceramics under the same manufacturing conditions as in Example 1 which were used to produce 4.7 GHz band resonators whose properties are shown in Table 3.

Comparison $BaCO_3$, $Sm_2O_3$, $Nd_2O_3$, $Eu_2O_3$, $La_2O_3$, $Bi_2O_3$, and $TiO_2$ powder of grain size of 1 μm or less, according to the compositional formula $Ba_{6-3x} \cdot \{Sm_{1-y} \cdot (Nd_{1-w-v}Eu_wLn_v)_{y-z}Bi_z\}_{8+2x} \cdot Ti_{18}O_{54}$ were blended and mixed with x=0.7, y=0.4, z=0.1, and v=0, w=0 before manufacturing dielectric ceramics under the same manufacturing conditions as in example which were used to produce resonators the same as in the examples whose properties are shown in Table 1. Also, with the aforesaid compositional formula, dielectric ceramics of the composition x=0.7, y=0.4, z=0, v=1, Ln=La were manufactured under the same conditions as in the examples and their properties are shown in Table 1.

TABLE 1

|  |  | v = 0.45<br>w = 0.05 | v = 0.4<br>w = 0.1 | v = 0.35<br>w = 0.15 | v = 0.3<br>w = 0.2 | v = 0.25<br>w = 0.25 | v = 0<br>w = 0.5 |
|---|---|---|---|---|---|---|---|
| In air | Qf (GHz) | 7157 | 7175 | 7116 | 6935 | 6124 | 6003 |
|  | ε | 91.48 | 91.15 | 90.45 | 89.73 | 87.43 | 82.91 |
|  | τf (ppm/° C.) | 2.62 | −8.24 | −5.38 | −9.16 | −12.36 | −15.0 |
| In | Qf (GHz) | 7181 | 7248 | 7155 | 6951 | 6238 | 6015 |
| 100% $O_2$ | ε | 92.46 | 92.21 | 91.76 | 90.65 | 88.58 | 83.11 |
| atmosphere | τf (ppm/° C.) | 2.59 | −3.22 | −5.58 | −9.00 | −17.35 | −19.9 |

|  |  | w = 0<br>v = 0 | w = 0<br>v = 1<br>Ln = La |
|---|---|---|---|
|  | Composition |  |  |
| Comparison | Qf (GHz) | 6100 | 9000 |
|  | ε | 89.5 | 83 |
|  | τf (ppm/° C.) | −20 | 16 |

TABLE 2

|  |  | v = 0.45<br>w = 0.05 | v = 0.4<br>w = 0.1 | v = 0.35<br>w = 0.15 | v = 0.3<br>w = 0.2 | v = 0<br>w = 0.5 |
|---|---|---|---|---|---|---|
| In air | Qf (GHz) | 7131 | 7118 | 7005 | 6510 | 6132 |
|  | ε | 91.00 | 90.81 | 90.13 | 89.87 | 85.30 |
|  | τf (ppm/° C.) | 0.11 | −6.21 | −10.0 | −14.2 | −17.7 |
| In | Qf (GHz) | 7136 | 7010 | 7018 | 6967 | 6389 |
| 100% $O_2$ | ε | 91.02 | 90.97 | 90.56 | 90.12 | 87.18 |
| atmosphere | τf (ppm/° C.) | 0.03 | −8.35 | −12.3 | −14.8 | −16.9 |

TABLE 3

|  |  | v = 0.45<br>w = 0.05 | v = 0.4<br>w = 0.1 | v = 0.35<br>w = 0.15 | v = 0.3<br>w = 0.2 | v = 0<br>w = 0.5 |
|---|---|---|---|---|---|---|
| In air | Qf (GHz) | 7051 | 7003 | 6987 | 6513 | 6212 |
|  | ε | 90.30 | 89.98 | 89.31 | 88.86 | 84.11 |
|  | τf (ppm/° C.) | −1.53 | −7.18 | −12.6 | −14.3 | −17.5 |
| In | Qf (GHz) | 7093 | 7096 | 7016 | 6888 | 6319 |
| 100% $O_2$ | ε | 90.88 | 90.54 | 90.02 | 89.58 | 85.97 |
| atmosphere | τf (ppm/° C.) | −2.30 | −8.13 | −12.9 | −15.1 | −18.24 |

INDUSTRIAL APPLICABILITY

In a $BaO\text{---}TiO_2\text{---}Nd_2O_3\text{---}Sm_2O_3$ based ceramics, by substituting some of the $Nd_2O_3$ by $Bi_2O_3$ and furthermore by substituting some of the $Nd_2O_3$ by $Ln_2O_3$ (where Ln=La, Ce, Pr), the properties $\epsilon$=88.5 to 92.5, Qf=6000 to 7300 GHz, τf=3 to −10 ppm/° C. were obtained. Also, by substituting with $Eu_2O_3$ instead of $Ln_2O_3$, a dielectric having the properties: $\epsilon$=85, Qf=6000 GHz, τf=−1.5 ppm/° C. can be obtained. Furthermore, by combining the aforementioned two effects, i.e. by substituting with $Eu_2O_3$ part of the substituted $Ln_2O_3$, improvement can be achieved to $\epsilon$=82.5 to 92.5, Qf=6000 to 7300 GHz, τf=10 to −20 ppm/° C.; in this way, excellent electrical properties can be provided for resonance cavities made of various materials and of large size.

What is claimed is:

1. A microwave dielectric ceramic composition whose compositional formula is represented by:

$$Ba_{6-3x} \cdot \{Sm_{1-y} \cdot (Nd_{1-w-v}Eu_w Ln_v)_{y-z} Bi_z\}_{8+2x} \cdot Ti_{18} O_{54} \text{ (where Ln=La,Pr)}$$

where the values of x, y, z, w and v in the compositional formula satisfy the following values:

0.5<x<0.8, 0.3<y<0.5, 0<z<0.4, 0<w≦1, 0<v≦1, y−z>0.

* * * * *